United States Patent
Mikawa et al.

(10) Patent No.: US 10,786,785 B2
(45) Date of Patent: Sep. 29, 2020

(54) GAS SEPARATION MEMBRANE

(71) Applicant: Asahi Kasei Kabushiki Kaisha, Tokyo (JP)

(72) Inventors: Masato Mikawa, Tokyo (JP); Yasutaka Kurishita, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 117 days.

(21) Appl. No.: 15/752,424

(22) PCT Filed: Aug. 8, 2016

(86) PCT No.: PCT/JP2016/073338
§ 371 (c)(1),
(2) Date: Feb. 13, 2018

(87) PCT Pub. No.: WO2017/026456
PCT Pub. Date: Feb. 16, 2017

(65) Prior Publication Data
US 2019/0009223 A1  Jan. 10, 2019

(30) Foreign Application Priority Data
Aug. 13, 2015  (JP) .................. 2015-159775

(51) Int. Cl.
B01D 69/02  (2006.01)
B01D 53/22  (2006.01)
(Continued)

(52) U.S. Cl.
CPC .......... B01D 69/02 (2013.01); B01D 53/228 (2013.01); B01D 67/0088 (2013.01);
(Continued)

(58) Field of Classification Search
CPC .............. B01D 53/228; B01D 67/0083; B01D 67/0088; B01D 69/02; B01D 69/10;
(Continued)

(56) References Cited

U.S. PATENT DOCUMENTS 4,990,165 A * 2/1991 Bikson ................ B01D 53/228
96/10
5,817,165 A  10/1998 Hachisuka et al.
(Continued)

FOREIGN PATENT DOCUMENTS

JP  H04-505123 A  9/1992
JP  H05-123549 A  5/1993
(Continued)

OTHER PUBLICATIONS

International Search Report issued in corresponding International Patent Application No. PCT/JP2016/073338 dated Oct. 18, 2016.
(Continued)

Primary Examiner — Jason M Greene
(74) Attorney, Agent, or Firm — Morgan, Lewis & Bockius LLP

(57) ABSTRACT

Provided is a gas separation membrane containing polysaccharides and being characterized by having a crystallinity of 17% or lower, the crystallinity being represented by equation (1) below: (1) Crystallinity (%)=$[I_c/(I_c+I_a)]\times100$ (In equation (1), $I_c$ is the sum of the integrals of the scattering intensities of crystalline peaks obtained from X-ray diffraction analysis of the gas separation membrane, and $I_a$ is the sum of the integrals of the scattering intensities of the amorphous halo).

11 Claims, 6 Drawing Sheets

(51) Int. Cl.
*B01D 67/00* (2006.01)
*B01D 71/10* (2006.01)
*B01D 69/12* (2006.01)

(52) U.S. Cl.
CPC ............. *B01D 69/12* (2013.01); *B01D 71/10* (2013.01); *B01D 2257/504* (2013.01); *B01D 2257/702* (2013.01); *B01D 2325/20* (2013.01)

(58) Field of Classification Search
CPC ........ B01D 69/12; B01D 71/08; B01D 71/10; B01D 71/12; B01D 2257/504; B01D 2257/702; B01D 2257/7022
See application file for complete search history.

(56) References Cited

U.S. PATENT DOCUMENTS

| | | | | |
|---|---|---|---|---|
| 2003/0052056 A1* | 3/2003 | Kim | ...................... | B01D 53/228 210/500.28 |
| 2004/0215045 A1* | 10/2004 | Herrera | ................ | B01D 53/228 585/818 |
| 2009/0301307 A1 | 12/2009 | Sugiyama et al. | | |
| 2010/0244306 A1* | 9/2010 | Tang | .................... | B01D 53/228 264/165 |
| 2016/0051938 A1 | 2/2016 | Okada et al. | | |
| 2018/0043298 A1* | 2/2018 | Liskey | ................. | B01D 53/228 |

FOREIGN PATENT DOCUMENTS

| | | | | |
|---|---|---|---|---|
| JP | 5-154365 | * | 6/1993 | ............. B01D 71/08 |
| JP | H05-154365 A | | 6/1993 | |
| JP | H09-000898 A | | 1/1997 | |
| JP | 2008-068238 A | | 3/2008 | |
| JP | 2011-161387 A | | 8/2011 | |
| JP | 5019502 B2 | | 9/2012 | |
| JP | 5507079 B2 | | 5/2014 | |
| WO | 90/13353 A1 | | 11/1990 | |
| WO | 2014/157069 A1 | | 10/2014 | |

OTHER PUBLICATIONS

International Preliminary Report on Patentability and Written Opinion issued in corresponding International Patent Application No. PCT/JP2016/073338 dated Feb. 13, 2018.

* cited by examiner

GAS SEPARATION MEMBRANE

TECHNICAL FIELD

The present invention relates to a gas separation membrane that demonstrates superior separation performance with respect to $CO_2$ and olefins.

BACKGROUND ART

The separation and concentration of gases by gas separation membranes offers superior energy efficiency and a higher level of safety in comparison with distillation and high-pressure adsorption. An innovative practical example thereof is the separation of hydrogen in processes for producing ammonia. Extensive studies have recently been conducted on methods for removing and recovering the greenhouse gas, carbon dioxide, from synthetic gas and natural gas (Patent Documents 1, 2 and 3).

The typical form of gas separation membranes consists of a structure in which a thin film layer having the ability to separate gas is arranged on the surface of a porous support. This form is effective for increasing the permeated amount of gas while imparting a certain degree of strength to the membrane. The separation layer in this case is frequently a layer containing a non-porous polymer.

In general, the performance of a gas separation membrane is expressed using permeation rate and separation factor as indices. Permeation rate is expressed as (permeability coefficient of gas)/(thickness of separation layer). As is clear from the aforementioned equation, examples of schemes for obtaining a membrane having a large permeation rate include reducing the thickness of the separation layer (Patent Documents 4 and 5) and increasing the permeability coefficient of the gas. Namely, using a material having a large permeability coefficient and separation factor and reducing the thickness thereof as much as possible are important for obtaining an efficient membrane process. Separation factor is expressed as the ratio of the permeation rates of two types of gases to be separated, and is dependent on the gas separating polymer.

Cellulose acetate (CA) membranes are used as gas separation membranes in a wide range of applications. CA membranes are mainly used to improve the quality of natural gas, including removal of carbon dioxide. Reasons for the practical use of CA membranes as carbon dioxide removal membranes consist of high pressure resistance and durability with respect to cohesive gases such as carbon dioxide or hydrocarbons. In other words, the performance required of practical gas separation membranes consists of demonstrating large gas separation ability along with a high level of durability with respect to the gases targeted for separation.

The membrane structure of a gas separation membrane typically adopts an asymmetrical structure consisting of a thin film layer having the ability to separate gas on a porous support. The porous support does not have the ability to separate gas, but rather functions as a support for supporting the thin film layer having the ability to separate gas. The thickness of the thin film layer is on the micrometer order. Further reducing the thickness of the thin film layer is significant from the viewpoints of enhancing productivity per module and making separation equipment more compact.

PRIOR ART DOCUMENTS

Patent Documents

Patent Document 1: International Publication No. 201/157069
Patent Document 2: Japanese Unexamined Patent Publication No. 2011-161387
Patent Document 3: Japanese Unexamined Patent Publication No. H9-898
Patent Document 4: Japanese Patent No. 5507079
Patent Document 5: Japanese Patent No. 5019502

DISCLOSURE OF THE INVENTION

Problems to be Solved by the Invention

It is generally difficult to reduce the thickness of gas separation membranes without causing defects. Thus, there are limitations on achieving an increased permeation rate by reducing thickness alone. With the foregoing in view, an object of the present invention is to provide a gas separation membrane that enables the permeability coefficient of a gas to be increased without reducing separation factor.

Means for Solving the Problems

The inventors of the present invention conducted extensive studies to solve the aforementioned problems. As a result, it was found that the aforementioned problems can be solved by imparting a suitable crosslinked structure to a polymer that composes the gas separation membrane, thereby leading to completion of the present invention.

The present invention is summarized as indicated below.

[1] A gas separation membrane containing a polysaccharide, wherein the degree of crystallinity as represented by the following equation (1) is 17% or less:

$$\text{degree of crystallinity (\%)} = [I_c/(I_c+I_a)] \times 100 \quad (1)$$

(wherein, $I_c$ represents the sum of the integral values of the scattering intensities of the crystalline peaks and $I_a$ represents the sum of the integral values of the scattering intensities of the amorphous halo when having carried out X-ray diffraction analysis on the gas separation membrane).

[2] The gas separation membrane described in [1], wherein the hydrate crystal index as represented by the following equation (2) is 65% or less:

$$\text{hydrate crystal index (\%)} = [(I_{10.2}-I_{13})/I_{10.2}] \times 100 \quad (2)$$

(wherein, $I_{10.2}$ represents peak intensity at $2\theta=10.2°$ and $I_{13}$ represents peak intensity at $2\theta=13.0°$ when having carried out X-ray diffraction analysis on the gas separation membrane).

[3] The gas separation membrane described in [1], wherein the non-hydrate crystal index as represented by the following equation (3) is 30% or less:

$$\text{non-hydrate crystal index (\%)} = [(I_{15.4}-I_{13})/I_{15.4}] \times 100 \quad (3)$$

(wherein, $I_{15.4}$ represents peak intensity at $2\theta=15.4°$ and $I_{13}$ represents peak intensity at $2\theta=13.0°$ when having carried out X-ray diffraction analysis on the gas separation membrane).

[4] The gas separation membrane described in any of [1] to [3], wherein the polysaccharide is chitosan.

[5] The gas separation membrane described in any of [1] to [3], containing Ag atoms or Cu atoms there within.

[6] The gas separation membrane described in any of [1] to [3], wherein the polysaccharide has a crosslinked structure.

[7] The gas separation membrane described in [6], wherein the crosslinked structure of the polysaccharide contains an amide structure.

[8] The gas separation membrane described in any of [1] to [3], wherein the binding energy of N1s when having carried out X-ray photoelectron spectroscopy on the gas separation membrane is 399.2 eV to 399.9 eV.

[9] The gas separation membrane described in any of [1] to [3], wherein binding energy of O1s when having carried out X-ray photoelectron spectroscopy on the gas separation membrane is 532.2 eV to 532.7 eV.

[10] The gas separation membrane described in any of [1] to [3], wherein the permeability coefficient of propylene gas is 100 Barrer to 3,000 Barrer and the separation factor α of propylene/propane is 50 to 1,000 under conditions of a measuring temperature of 30° C. and propylene partial pressure of 0.6 atmospheres.

[11] The gas separation membrane described in any of [1] to [3], wherein the permeability coefficient of $CO_2$ gas is 70 Barrer to 500 Barrer and the separation factor α of $CO_2/N_2$ is 20 to 100 under conditions of a measuring temperature of 30° C. and $CO_2$ partial pressure of 0.4 atmospheres.

[12] A method for producing the gas separation membrane described in any of [1] to [3], having a step for heating a polysaccharide to 80° C. or higher under acidic conditions.

[13] The method described in [12], wherein the polysaccharide has an amino group.

Effects of the Invention

According to the present invention, a gas separation membrane is provided that is provided with a high permeation rate and high separation performance with respect to a target gas.

BEST MODE FOR CARRYING OUT THE INVENTION

<Gas Separation Membrane>

Figure 1:
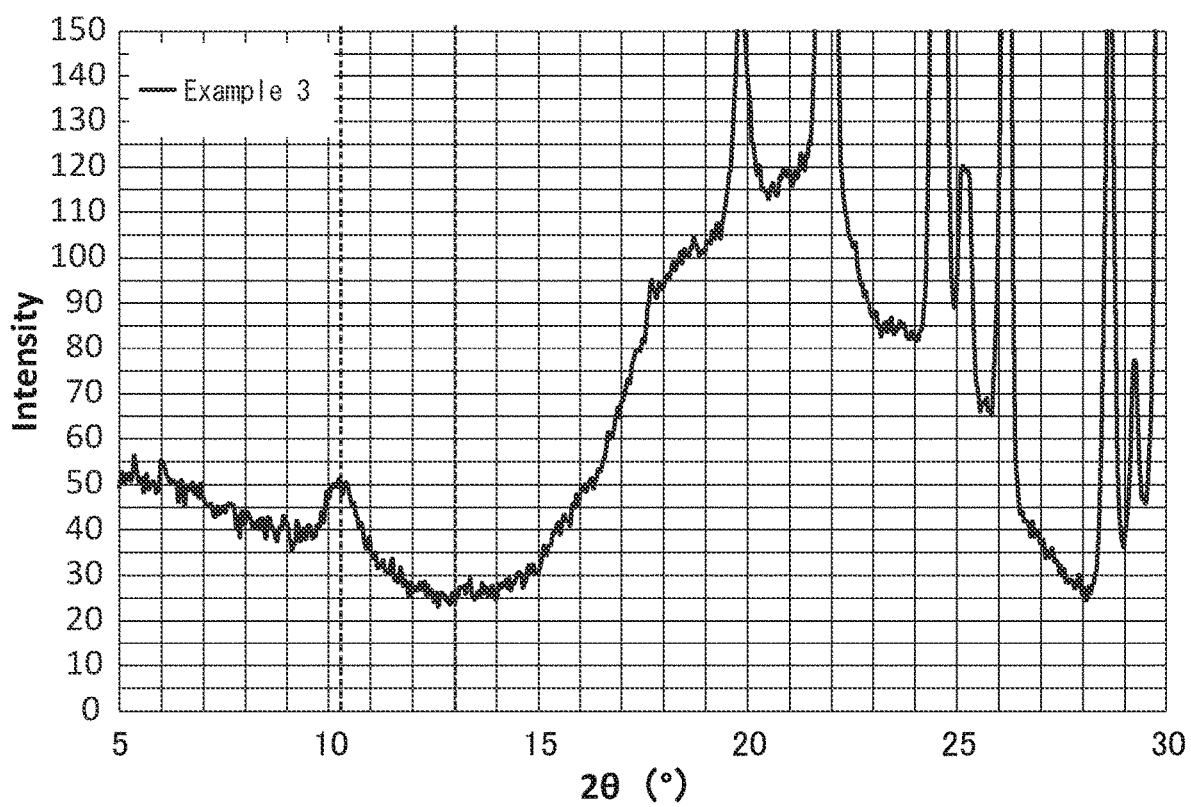
FIG. 1 is an XRD pattern of a gas separation membrane obtained in Example 3.
Figure 2:
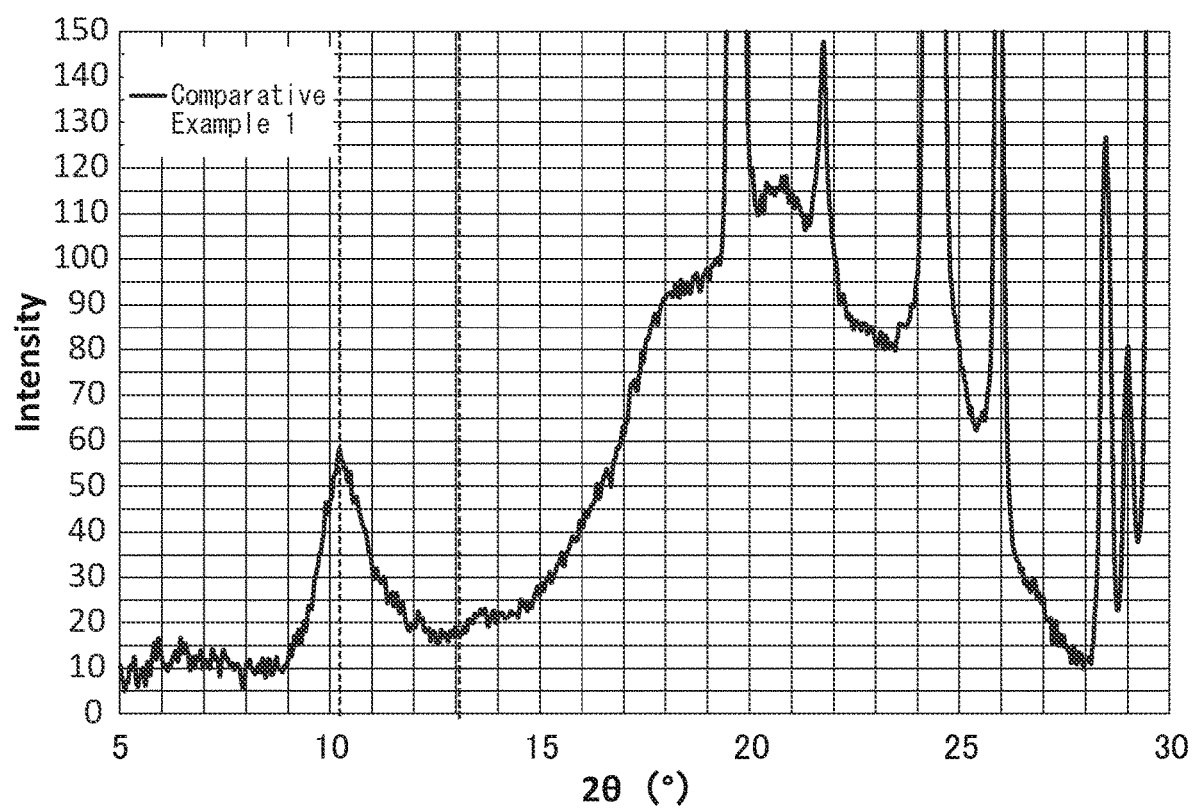
FIG. 2 is an XRD pattern of a gas separation membrane obtained in Comparative Example 1.
Figure 3:
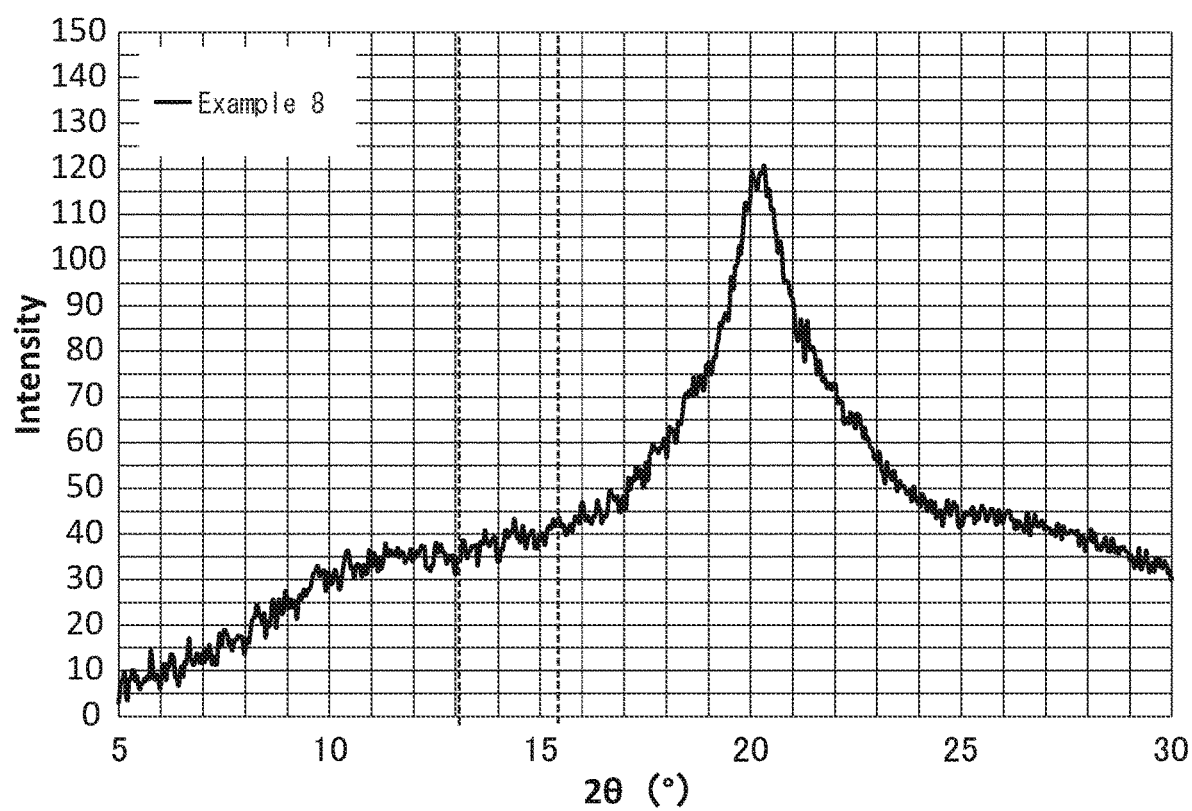
FIG. 3 is an XRD pattern of a gas separation membrane obtained in Example 8.
Figure 4:
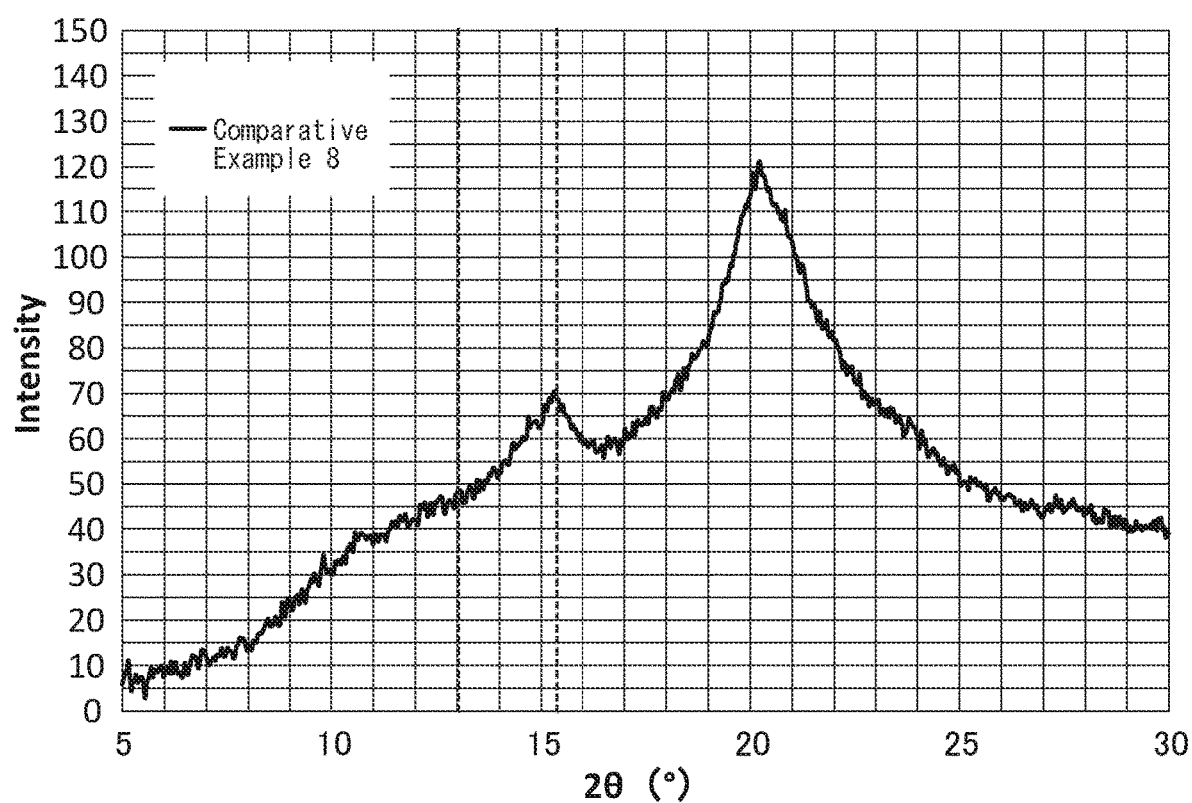
FIG. 4 is an XRD pattern of a gas separation membrane obtained in Comparative Example 8.

The gas separation membrane of the present invention contains a polysaccharide having a crosslinked structure, and is characterized in that the degree of crystallinity thereof as represented by the following equation (1) is 17% or less:

$$\text{degree of crystallinity (\%)} = [I_c/(I_c+I_a)] \times 100 \quad (1)$$

(wherein, $I_c$ represents the sum of the integral values of the scattering intensities of the crystalline peaks and $I_a$ represents the sum of the integral values of the scattering intensities of the amorphous halo when having carried out X-ray diffraction analysis on the gas separation membrane).

In the present invention, a polysaccharide refers to a macromolecule having a structure obtained by linking monosaccharides with glycosidic bonds, and encompasses the concept of including oligosaccharides. The number of repeating units of the polysaccharide is preferably 100 to 10,000, more preferably 300 to 7,000, and even more preferably 500 to 4,000.

The polysaccharide incorporated in the gas separation membrane of the present invention preferably has a crosslinked structure. In the present invention, the crosslinked structure preferably has a structure selected from the group consisting of, for example, an amide group, carbamate group, carbonate group and imino group. The crosslinked structure particularly preferably has a structure having an amide group from the viewpoint of efficiently inducing amorphization of the crystal structure and enabling the effects of the present invention to be reliably demonstrated.

The aforementioned crosslinked structure has a structure derived from a reactive functional group possessed by the polysaccharide used as raw material. Examples of such reactive functional groups include an amino group, hydroxyl group, aldehyde group, amide group and carboxyl group. Among these, an amino group yields an amide group, which constitutes a preferable crosslinked structure.

Examples of polysaccharides having such reactive functional groups include chitosan, alginic acid, pectin, chondroitin, hyaluronic acid, xanthan gum, cellulose, chitin, pullulan, oligoglucosamine, oligofructose and derivatives thereof. These polysaccharides may be used alone or as a mixture. Among these polysaccharides, the use of chitosan having an amino group is preferable from the viewpoint of yielding an amide group by subjecting to heat treatment under acidic conditions.

The crosslinked structure of the polysaccharide incorporated in the gas separation membrane of the present invention can be analyzed by X-ray diffraction (XRD).

XRD measurement can be carried out under, for example, the conditions indicated below using a commercially available X-ray analyzer (such as "NanoViewer" manufactured by Rigaku Corp.).

X-ray wavelength λ: 0.154 nm
Optical system: Point collimation (1st slit: 0.4 mm φ, 2nd slit: 0.2 mmφ and guard slit: 0.8 mmφ)
Detector: Imaging plate (IP)
Sample environment: Vacuum If a crosslinked structure is present in the gas separation membrane, the intensities of diffraction peaks derived from the crystal planes exhibit a relative decrease in XRD measurement since the crystal structure inherently possessed by the polysaccharide is destroyed. Therefore, in the case the polysaccharide used for the raw material of the gas separation membrane has crystals, it is convenient to evaluate the degree of crosslinking thereof with the degree of crystallization as represented by the following equation (1):

$$\text{degree of crystallinity (\%)} = [I_c/(I_c+I_a)] \times 100 \quad (1)$$

(wherein, $I_c$ represents the sum of the integral values of the scattering intensities of the crystalline peaks and $I_a$ represents the sum of the integral values of the scattering intensities of the amorphous halo when having carried out X-ray diffraction analysis on the gas separation membrane).

Degree of crystallization is calculated after having separated the XRD profile within the range of 2θ=5° to 40° into crystalline peaks and amorphous peaks and assuming that all of the peak shapes are Gaussian. The following indicates a specific technique for obtaining scattering profiles when carrying out peak separation.

1) The membrane is immersed for 24 hours in an aqueous silver nitrate solution having a concentration of 7 M followed by drying for 1 hour in a dark location in a vacuum.

2) The film subjected to the aforementioned treatment is irradiated with X-rays from the direction normal thereto followed by carrying out XRD measurement using a two-dimensional detector. The sample environment is made to be free of oxygen to prevent oxidation of the silver nitrate during measurement. At this time, measurements are carried out under conditions that allow the obtaining of an adequate N/S ratio. The resulting scattering pattern is then corrected for scattering in the case of a blank cell.

3) A circular average is then determined for the resulting two-dimensional XRD pattern. In the case diffraction derived from an inorganic compound is observed in the two-dimensional XRD pattern, a scattering prolife can be obtained for the resin only by determining the circular average of the pattern after removing the diffraction derived from the inorganic compound by a method such as masking.

4) Background noise attributable to factors such as thermal diffuse scattering is removed from the resulting scattering profile by assuming to be linear. Background noise is determined as the common tangent that connects the lower edge of the narrow angle side and wide angle side in a scattering pattern obtained by adding together the crystalline peaks within a range of $2\theta=5°$ to $4°$ and the amorphous halo. At this time, inconsistencies such as scattering becoming negative following removal of background noise are made to not occur.

5) The sum $I_c$ of the integral values of the scattering intensities of the crystalline peaks and the sum $I_a$ of the integral values of the scattering intensities of the amorphous halo are each determined followed by substituting these values into the aforementioned equation (1) to calculate the degree of crystallization of the gas separation membrane.

XRD measurements can be carried out, for example, under the conditions indicated below using a commercially available X-ray analyzer (such as "NanoViewer" manufactured by Rigaku Corp.).

X-way wavelength λ: 0.154 nm
Optical system: Point collimation (1st slit: 0.4 mφ, 2nd slit: 0.2 mmφ and guard slit: 0.8 mmφ)
Detector: Imaging plate (IP)
Sample environment: Vacuum
Exposure time: 12 hours The degree of crystallization of the gas separation membrane is preferably 15% or less and more preferably 10% or less. The value of the degree of crystallization may be 0%.

In the case the polysaccharide used for the raw material of the gas separation membrane has hydrate crystals, it is convenient to evaluate the degree of crosslinking thereof with the hydrate crystal index as represented by the following equation (2), while in the case the polysaccharide has non-hydrate crystals, it is convenient to evaluate the degree of crosslinking with the non-hydrate crystal index as represented by the following equation (3):

$$\text{hydrate crystal index (\%)}=[(I_{10.2}-I_{13})/I_{10.2}]\times 100 \quad (2)$$

$$\text{non-hydrate crystal index (\%)}=[(I_{15.4}-I_{13})/I_{15.4}]\times 100 \quad (3)$$

(wherein, in equation (2), $I_{10.2}$ represents peak intensity at $2\theta=10.2°$ and $I_{13}$ represents peak intensity at $2\theta=13.0°$ when having carried out X-ray diffraction analysis on the gas separation membrane, and in equation (3), $I_{15.4}$ represents peak intensity at $2\theta=15.4°$ and $I_{13}$ represents peak intensity at $2\theta=13.0°$ when having carried out X-ray diffraction analysis on the gas separation membrane).

The peak of $2\theta=10.2°$ is the peak derived from diffraction by the 020 plane of a hydrate crystal, the peak of $2\theta=15.4°$ is the peak derived from diffraction by the 120 plane of a hydrate crystal, and $2\theta=13.0°$ is the peak derived from being amorphous.

The aforementioned hydrate crystal index of the gas separation membrane of the present invention is preferably 65% or less or the non-hydrate crystal index is 30% or less. Since a gas separation membrane having a crystal index within this range has suitable crosslinking, a favorable balance can be achieved between gas permeability and separation performance, thereby making this preferable.

The type of crosslinked structure in the gas separation membrane can be analyzed by infrared spectroscopy (IR) or X-ray photoelectron spectroscopy (XPS).

For example, an amide group exhibits absorbance at two locations on the IR chart thereof consisting of 1,630 $cm^{-1}$ to 1,670 $cm^{-1}$ and 1,540 $cm^{-1}$ to 1,580 $cm^{-1}$.

IR measurement can be carried out by micro IR measurement, for example, under the conditions below by sampling and crushing a gas separation membrane on a substrate transparent to infrared light (such as a Ge substrate).

IR apparatus: Model LUMOS, Bruker AXS
Measuring method: Transmission method
Frequency resolution: 4 $cm^{-1}$
Cumulative number: 64 times
Measuring region: 124 μm×124 μm During XPS, N1s of an amide group exhibits a binding energy peak at 399.2 eV to 399.9 eV, while O1s of a crosslinking hydroxyl group exhibits a binding energy peak at 532.5 eV to 532.9 eV.

XPS measurement can be carried out, for example, under the conditions indicated below.

XPS apparatus: Escalab 250, Thermo Fisher Scientific Inc.
Excitation source: mono. AlKα, 15 kV×10 mA
Analysis size: Approx. 1 mm oval shape
Photoelectron takeoff angle: 0°
Capture Regions:
Survey scan: 0 eV to 1,100 eV
Narrow scan: S2p, C1s, O1s, N1s
Pass Energy:
Survey scan: 100 eV
Narrow scan: 20 eV The gas separation membrane of the present invention may also contain a metal salt. Examples of metal salts preferably include salts composed of a cation selected from the group consisting of a monovalent silver ion, monovalent copper ion and complex ions thereof, and an anion selected from the group consisting of $F^-$, $Cl^-$, $Br^-$, $I^-$, $CN^-$, $NO_3^-$, $SCN^-$, $ClO_4^-$, $CF_3SO_3^-$, $BF_4^-$ and $PF_6^-$. Among these, $Ag(NO_3)$ is particularly preferable from the viewpoints of availability and product cost.

The concentration of metal salt in the gas separation membrane of the present invention is preferably 10% by weight to 90% by weight, more preferably 30% by weight to 80% by weight, and even more preferably 40% by weight to 70% by weight based on the total weight of the polysaccharide and metal salt.

The gas separation membrane of the present invention may only be composed of a polysaccharide having a crosslinked structure as previously described, and optionally, a metal salt contained therein, or may further contain other components.

The gas separation membrane of the present invention can be made to have a propylene gas permeability coefficient of 100 Barrer to 3,000 Barrer and a propylene/propane separation factor α of 50 to 1,000 under conditions consisting of a measuring temperature of 30° C. and propylene partial pressure of 0.6 atmospheres. The permeability coefficient of propylene gas under the aforementioned conditions can further be made to be 150 Barrer or more and particularly 500 Barrer or more. In a particularly preferable aspect, a value of about 2,000 Barrer or about 3,000 Barrer can be demonstrated for the permeability coefficient of propylene gas. The separation factor α of propylene/propane can be further made to be 60 or more and particularly 100 or more. In the case the gas separation membrane of the present invention contains a metal salt, the permeability coefficient of propylene and the separation factor α of propylene/propane become higher, thereby making this preferable. In the case of applying the gas separation membrane of the present invention to separation of propylene and propane, the gas separation membrane preferably contains a metal salt.

The gas separation membrane of the present invention can be made to have a $CO_2$ gas permeability coefficient of 70 Barrer to 500 Barrer and a $CO_2/N_2$ separation factor α of 20 to 100 under conditions of a measuring temperature of 30° C. and $CO_2$ partial pressure of 0.4 atmospheres.

The permeability coefficient for $CO_2$ gas under the aforementioned conditions can further be made to be 80 Barrer or more and particularly 100 Barrer or more. The separation factor α of $CO_2/N_2$ can further be made to be 30 or more and particularly 40 or more. In the case the gas separation membrane of the present invention does not contain a metal salt, the gas separation membrane demonstrates a high $CO_2$ gas permeability coefficient and high $CO_2/N_2$ separation factor α in this manner. In the case of applying the gas separation membrane of the present invention to separation of $CO_2$ and $N_2$, the gas separation membrane preferably does not contain a metal salt since gas separation membranes containing a metal salt have poor affinity with $CO_2$.

<Method for Producing Gas Separation Membrane>

The gas separation membrane of the present invention can be easily produced by a production method comprising a step for heating a polysaccharide to 80° C. or higher under acidic conditions.

Heating the polysaccharide under acidic conditions causes the polysaccharide to undergo intramolecular crosslinking and intermolecular crosslinking, resulting in a portion of the crystal structure thereof becoming amorphous. A gas separation membrane that has been prepared by undergoing such heat treatment is able to demonstrate considerable improvement of permeability coefficient with respect to gas separation in comparison with a gas separation membrane containing a polysaccharide that is not crosslinked as a result of not having undergone heat treatment. The reason for the improvement of permeability coefficient resulting from heat treatment under acidic conditions is thought to be that, as a result of the polysaccharide segment forming a three-dimensional crosslinked network structure due to this heat treatment, thereby causing amorphization of the crystal structure of the polysaccharide, gas is able to selectively permeate the amorphous portion.

This heat treatment can be carried out according to, for example, methods (1) and (2) indicated below.

(1) A coating solution composed of an aqueous solution containing a polysaccharide and an acid is coated onto a suitable supporting substrate to form a coated film followed by subjecting the coated film to heat treatment.

(2) A coating solution composed of an aqueous solution containing a polysaccharide is coated onto a suitable supporting substrate to form a coated film followed by immersing the resulting coated film in an aqueous solution containing an acid and subsequently subjecting the coated film to heat treatment following immersion.

An explanation is first provided of the aforementioned method (1).

In method (1), after having formed a coated film on a substrate, treatment so as to dissipate acid from the coated film is preferably not carried out during the time until heat treatment is carried out. Examples of treatment that causes acid to dissipate from the coated film include washing the coated film or contacting with base.

Examples of substrates used for the aforementioned supporting substrate include those composed of glass, polytetrafluoroethylene (such as Teflon@) and metal.

The concentration of polysaccharide in the aforementioned coating solution is preferably 0.5% by weight to 10% by weight.

Examples of the aforementioned acid include acetic acid, lactic acid, citric acid, sulfuric acid and propionic acid. These acids may be used alone or as a mixture. The concentration of acid in the coating solution is preferably 0.5% by weight to 10% by weight and more preferably 0.5% by weight to 8% by weight.

The coating solution may contain only the aforementioned components or may further contain optional components in addition thereto. Examples of optional components used include surfactants, pH adjusters, thickeners and preservatives.

Preparation of the coating solution by first going through a step for preparing an acidic aqueous solution that contains the aforementioned acid and then adding a polysaccharide to the acidic aqueous solution to dissolve therein is preferable from the viewpoint of easily and efficiently dissolving the polysaccharide.

After coating the coating solution, a coated film can be obtained by carrying out a drying step as necessary. This drying step can be carried out by method consisting of allowing the coated film to stand undisturbed at a temperature of preferably 10° C. to lower than 80° C. and more preferably 20° C. to 70° C. for preferably 5 minutes to 240 minutes and more preferably 5 minutes to 180 minutes.

The thickness of a coated film formed in this manner is preferably 0.01 μm to 100 μm and more preferably 0.1 μm to 50 μm.

Heat treatment is then carried out on the coated film obtained in this manner. The temperature of heat treatment is 80° C. or higher. If the temperature of this heat treatment is lower than 80° C., the polysaccharide crosslinking reaction does not proceed efficiently, thereby preventing the obtaining of a high gas permeability coefficient. A gas separation membrane subjected to heat treatment of 80° C. or higher demonstrates a high gas permeability coefficient, thereby making this preferable. For example, a permeability coefficient that is roughly double that in the case of not carrying out heat treatment is obtained if the heating temperature is made to be 120° C. A permeability coefficient that is roughly 10 times that in the case of not carrying out heat treatment is obtained if the heating temperature is made to be 140° C. The upper limit of the heat treatment temperature is preferably 250° C. or lower, more preferably 230° C. or lower and even more preferably 200° C. or lower. Heating time is preferably 1 minute to 240 minutes and more preferably 1 minute to 180 minutes.

The heating atmosphere is preferably an atmosphere that contains oxygen, and heating in air is sufficient. Heating in an atmosphere containing an inert gas such as nitrogen or helium tends to result in inadequate intramolecular and intermolecular crosslinking of the polysaccharide.

Next, an explanation is provided of the aforementioned method (2).

In method (2), a coating solution composed of an aqueous solution containing a polysaccharide is coated onto a supporting substrate. The coating solution used may be the same as the coating liquid used in the aforementioned method (1), except that the solution does not contain an acid. The supporting substrate, polysaccharide concentration and optional components in the coating solution, drying step following coating, and thickness of the coated film are the same as those in method (1).

In method (2), after having formed a coated film, the resulting coated film is immersed in an aqueous solution containing an acid. Examples of acids used here include acetic acid, lactic acid, citric acid, sulfuric acid and propionic acid. These acids may be used alone or as a mixture. The concentration of acid in the acidic aqueous solution is preferably 0.5% by weight to 10% by weight and more preferably 0.5% by weight to 8% by weight. The acidic solution may contain only acid or may further contain optional components in addition thereto similar to those of the coating solution of method (1).

The temperature during immersion is, for example, 0° C. to 100° C. and preferably 5° C. to 80° C.

The immersion time is, for example, 10 minutes or more. A longer immersion time is preferable from the viewpoint of technical requirements. However, even if the immersion time is lengthened without limitation, the resulting effect thereof does not increase in proportion to the increase in immersion time, thereby resulting in the possibility of the process time required to produce the gas separation membrane becoming excessively long. On the basis thereof, immersion time is preferably 72 hours or less.

Treatment for dissipating the acid from the coated film is preferably not carried out during the time from immersion of the coated film in the acidic aqueous solution to the time heat treatment is carried out.

Heat treatment carried out on the coated film after immersion is the same as that in the case of method (1).

In the present invention, it is important to go through a step for heat treating a coated film containing a polysaccharide in the presence of acid regardless of which of the aspects of method (1) and method (2) are employed. The acid is presumed to hydrolyze glycosidic bonds in the polysaccharide while also being involved in the formation of a crosslinked structure in the coated film.

According to studies conducted by the inventors of the present invention, there was no significant change in the gas permeability coefficient of the resulting gas separation membrane in comparison with that before heat treatment if heat treatment was carried out on the coated film in the absence of acid. This is presumed to be due to the crosslinking reaction being unable to proceed adequately in the case of heating the coated film under conditions in which acid is not present.

The gas separation membrane is formed on the supporting substrate in the manner described above.

The thickness of the gas separation membrane is preferably 0.01 µm to 100 mm and more preferably 0.01 µm to 50 µm.

A thin film of a highly permeable material may be further formed as desired on the surface of the gas separation membrane obtained in the manner described above. The formation of a thin film of a highly permeable material on the surface of the gas separation membrane makes it possible to fill in defects in the gas separation membrane, thereby making this preferable. Examples of highly permeable materials used here include polysiloxane, fluorine polymer compounds, heat-curable silicone rubber and UV-curable epoxy silicone. The film thickness of the thin film is preferably 0.01 µm to 10 µm and more preferably 0.01 µm to 5 µm.

The gas separation membrane formed on the substrate can be easily peeled off by contacting with an aqueous alcohol solution. Ethanol, for example, can be used for the aforementioned alcohol.

The gas separation membrane of the present invention has either a nonporous symmetrical structure or an asymmetrical structure having a thin, nonporous layer loaded onto the surface of a porous support.

The gas separation membrane of the present invention can be used by forming into any arbitrary shape that facilitates ease of use such as a flat sheet, helical sheet, disk, tube, hollow fiber or thin film composite material.

EXAMPLES

The following provides a more detailed explanation of the present invention using examples thereof. The present invention is not limited in any way to these examples.

Example 1

4 g of chitosan were added to a bottle containing 2 g of acetic acid and 94 g of distilled water and dissolved therein by stirring overnight. After dissolving, the resulting aqueous solution was subjected to pressure filtration with a filter having a pore size of 5 µm to remove insoluble impurities. The filtered aqueous solution was then degassed by allowing to stand undisturbed for 24 hours. The aqueous solution was spread over a glass plate and the film thickness of the coated film was adjusted using a doctor blade that controlled the coating thickness to 1.250 µm. After subjecting the resulting coated film to drying treatment for 0.3 hours at 80° C., the coated film was immersed in a sodium hydroxide solution having a concentration of 0.8 M (using a solvent consisting of a mixed solvent of ethanol and water at a ratio (volume ratio) of 80:20) for 3 days followed by additionally immersing in distilled water for 24 hours. The coated film was then immersed in a 7 M silver nitrate solution for 72 hours to obtain a gas separation membrane containing silver atoms. In the present example, the gas separation membrane was not dried following film deposition.

The glass plate having the gas separation membrane formed thereon in the manner described above was immersed in a sodium hydroxide solution having a concentration of 0.8 M (using a solvent consisting of a mixed solvent of ethanol and water at a ratio (volume ratio) of 80:20) to separate the gas separation membrane from the plate.

The permeation rates of propane and propylene were measured using this gas separation membrane.

Measurement was carried out using a mixed gas composed of propane and propylene (propane:propylene=40:60 (weight ratio)) with an isobaric system in a humidified atmosphere at a supply side gas flow rate of 50 cc/min and permeation side gas flow rate of 50 cc/min. The measuring temperature was 30° C.

The measurement results are shown in Table 1.

Examples 2 to 4 and Comparative Example 1

Gas separation membranes were fabricated and evaluated according to the same method as Example 1 with the exception of respectively changing the temperature and time during the drying treatment after adjusting the coated film thickness with a doctor blade in Example 1 to that shown in Table 1.

The results are shown in Table 1.

Comparative Examples 2 to 5

Gas separation membranes obtained according to the same procedure as Comparative Example 1 were respectively further subjected to a heating step under the temperature and time conditions shown in Table 1 following film deposition.

The results of evaluating the gas separation membranes obtained by going through a heating step following film deposition according to the same method as Example 1 are shown in Table 1.

Example 5

Cellulose powder in an amount equivalent to 4% by weight was added to a solution prepared by stirring a mixture of 55.2 parts by weight of ethylenediamine (anhydride) and 44.8 parts by weight of potassium thiocyanate under nitrogen followed by dissolving by stirring at 60° C. to obtain a solution. After removing insoluble impurities from the resulting solution by subjecting to pressure filtration with a filter having a pore size of 5 μm, the filtered solution was degassed by allowing to stand undisturbed for 24 hours. The solution was spread onto a glass plate and the thickness of the coated film was adjusted using a doctor blade that controlled the coating thickness to 1.250 μm. Solvent was removed by allowing the resulting coated film to stand undisturbed for 72 hours at room temperature to obtain a glass plate having a film formed thereon. After then immersing the glass plate in a mixed solvent of ethanol and water at a ratio (volume ratio) of 80:20 for 3 days, the glass plate was further immersed in distilled water for 24 hours to separate the film from the glass plate.

The resulting separated film was immersed in 2% aqueous acetic acid solution for 24 hours and then subjected to drying treatment for 3 hours at 160° C. The film was then immersed in a sodium hydroxide solution having a concentration of 0.8 M (using a solvent consisting of a mixed solvent of ethanol and water at a ratio (volume ratio) of 80:20) for 3 days followed by immersing in distilled water for 24 hours. A gas separation membrane containing silver atoms was obtained by further immersing in a 7 M aqueous sliver nitrate solution for 72 hours. In the present example, drying was not carried out after depositing the gas separation membrane.

The results of measuring the permeation rates of propane and propylene using this gas separation membrane according to the same method as Example 1 are shown in Table 1.

Comparative Examples 6 and 7

Gas separation membranes were obtained in the same manner as Example 5 with the exception of not carrying out immersion in 2% aqueous acetic acid solution as in Example 5, and carrying out heat treatment under the temperature and time conditions shown in Table 1 following film deposition.

The results of measuring the permeation rates of propane and propylene using the resulting gas separation membrane according to the same method as Example 1 are shown in Table 1.

TABLE 1

|  | Drying Treatment | | Post-Deposition Heat Treatment | | Propylene Permeation | Propane Permeation | Propylene/propane |
| --- | --- | --- | --- | --- | --- | --- | --- |
|  | Temp. (° C.) | Time (h) | Temp. (° C.) | Time (h) | Coefficient (Barrer) | Coefficient (Barrer) | Separation Factor |
| Example 1 | 80 | 3 | — | — | 85 | 0.40 | 210 |
| Example 2 | 120 | 3 | — | — | 199 | 0.97 | 205 |
| Example 3 | 140 | 3 | — | — | 1007 | 4.03 | 250 |
| Example 4 | 160 | 3 | — | — | 1521 | 5.85 | 260 |
| Example 5 | 160 | 3 | — | — | 785 | 5.20 | 151 |
| Comp. Ex. 1 | Room temp. (23° C.) | 72 | — | — | 80 | 0.43 | 185 |
| Comp. Ex. 2 | Room temp. (23° C.) | 72 | 80 | 3 | 85 | 0.42 | 201 |
| Comp. Ex. 3 | Room temp. (23° C.) | 72 | 120 | 3 | 87 | 0.44 | 199 |
| Comp. Ex. 4 | Room temp. (23° C.) | 72 | 140 | 3 | 82 | 0.39 | 210 |
| Comp. Ex. 5 | Room temp. (23° C.) | 72 | 160 | 3 | 90 | 0.45 | 198 |
| Comp. Ex. 6 | — | 72 | — | — | 67 | 0.46 | 145 |
| Comp. Ex. 7 | — | 72 | 160 | 3 | 69 | 0.48 | 144 |

Example 6

A gas separation membrane was fabricated according to the same method as Example 1 with the exception of not immersing in aqueous silver nitrate solution as in Example 1.

The gas permeability coefficients of $CO_2$ and $N_2$ were measured using this gas separation membrane.

Measurements were carried out using each pure $CO_2$ and $N_2$ gas with an isobaric system in a humidified atmosphere at a supply side gas flow rate of 50 cc/min and permeation side gas flow rate of 50 cc/min. The measuring temperature was 30° C.

The measurement results are shown in Table 2.

Examples 7 and 8 and Comparative Examples 8 and 9

Gas separation membranes were fabricated and evaluated according to the same method as Example 6 with the exception of respectively changing the temperature and time during the drying treatment after adjusting the coated film thickness with a doctor blade in Example 6 to that shown in Table 2.

The evaluation results are shown in Table 2.

TABLE 2

| | Drying Treatment | | Post-Deposition Heat Treatment | | $CO_2$ Permeation Coefficient (Barrer) | $N_2$ Permeation Coefficient (Barrer) | $CO_2/N_2$ Separation Factor |
|---|---|---|---|---|---|---|---|
| | Temp. (° C.) | Time (h) | Temp. (° C.) | Time (h) | | | |
| Example 6 | 80 | 3 | — | — | 63 | 0.9 | 70 |
| Example 7 | 120 | 3 | — | — | 82 | 1.14 | 72 |
| Example 8 | 140 | 3 | — | — | 412 | 6.06 | 68 |
| Comp. Ex. 8 | Room temp. (23° C.) | 72 | — | — | 45 | 0.74 | 61 |
| Comp. Ex. 9 | Room temp. (23° C.) | 72 | 140 | 3 | 42 | 0.75 | 56 |

1<X-Ray Diffraction (XRD) Analysis Example (1)>

Gas separation membranes obtained using the same procedures as the aforementioned Example 3 and Comparative Example 1 as well as Example 8 and Comparative Example 8 were respectively dried for 72 hours under conditions of room temperature (23° C.) and 50% RH.

Each of the gas separation membranes obtained by going through the aforementioned drying step was subjected to X-ray diffraction (XRD) analysis followed by respectively calculating the hydrate crystal indices for the gas separation membranes of Example 3 and Comparative Example 1 and the non-hydrate crystal indices for the gas separation membranes of Example 8 and Comparative Example 8 according to the equations indicated below. The XRD patterns of each experimental example are shown in FIGS. 1 to 4, while the results for calculating each of the crystal indices are shown in Table 3.

Hydrate crystal index (%)=$[(I_{10.2}-I_{13})/I_{10.2}]\times 100$ (2)

(In equation (2), $I_{10.2}$ represents peak intensity at $2\theta=10.2°$ and $I_{13}$ represents peak intensity at $2\theta=13.0°$ when having carried out X-ray diffraction analysis on the gas separation membranes.)

Non-hydrate crystal index (%)=$[(I_{15.4}-I_{13})/I_{15.4}]\times 100$ (3)

(In equation (3), $I_{15.4}$ represents peak intensity at $2\theta=15.4°$ and $I_{13}$ represents peak intensity at $2\theta=13.0°$ when having carried out X-ray diffraction analysis on the gas separation membranes.)

TABLE 3

| | Peak Intensity $2\theta$ | | | Hydrate crystal index (%) | Non-hydrate crystal index (%) |
|---|---|---|---|---|---|
| | 10.2° | 15.4° | 13.0° | | |
| Example 3 | 50 | — | 26 | 48 | — |
| Comp. Ex. 1 | 60 | — | 18 | 70 | — |
| Example 8 | — | 45 | 40 | — | 11 |
| Comp. Ex. 8 | — | 70 | 45 | — | 36 |

<Example of Analysis by X-ray Photoelectron Spectroscopy (XPS)>

Gas separation membranes obtained using the same procedures as the aforementioned Example 8 and Comparative Example 8 were respectively dried for 72 hours under conditions of room temperature (23° C.) and 50% RH.

Each of the gas separation membranes obtained by going through the aforementioned drying step was subjected to X-ray photoelectron spectroscopy (XPS) followed by measuring the binding energy of $N_{1s}$.

XPS analysis was also carried out on each of the following compounds followed by measurement of the binding energy of $N_{1s}$ for reference purposes.

Tribenzyl-Amino-Triazine

Poly(vinylpyridine) (trade name: "Poly(2-vinylpyridine)", weight average molecular weight: 40,000, Wako Pure Chemical Industry Co., Ltd.)

Triphenylamine

Diphenylguanidine

The evaluation results are shown in Table 4.

TABLE 4

| | N1s Binding Energy (eV) |
|---|---|
| Example 8 | 399.4 |
| Comparative Example 8 | 399.2 |
| Tribenzyl-amino-triazine | 398.4 |
| Poly (vinylpyridine) | 398.6 |
| Triphenylamine | 399.7 |
| Diphenylguanidine | 399.7 |

<Infrared Spectroscopy Analysis Example>

Gas separation membranes obtained using the same procedures as Example 8 and Comparative Examples 8 and 9 were respectively dried for 72 hours under conditions of room temperature (23° C.) and 50% RH.

Figure 5:
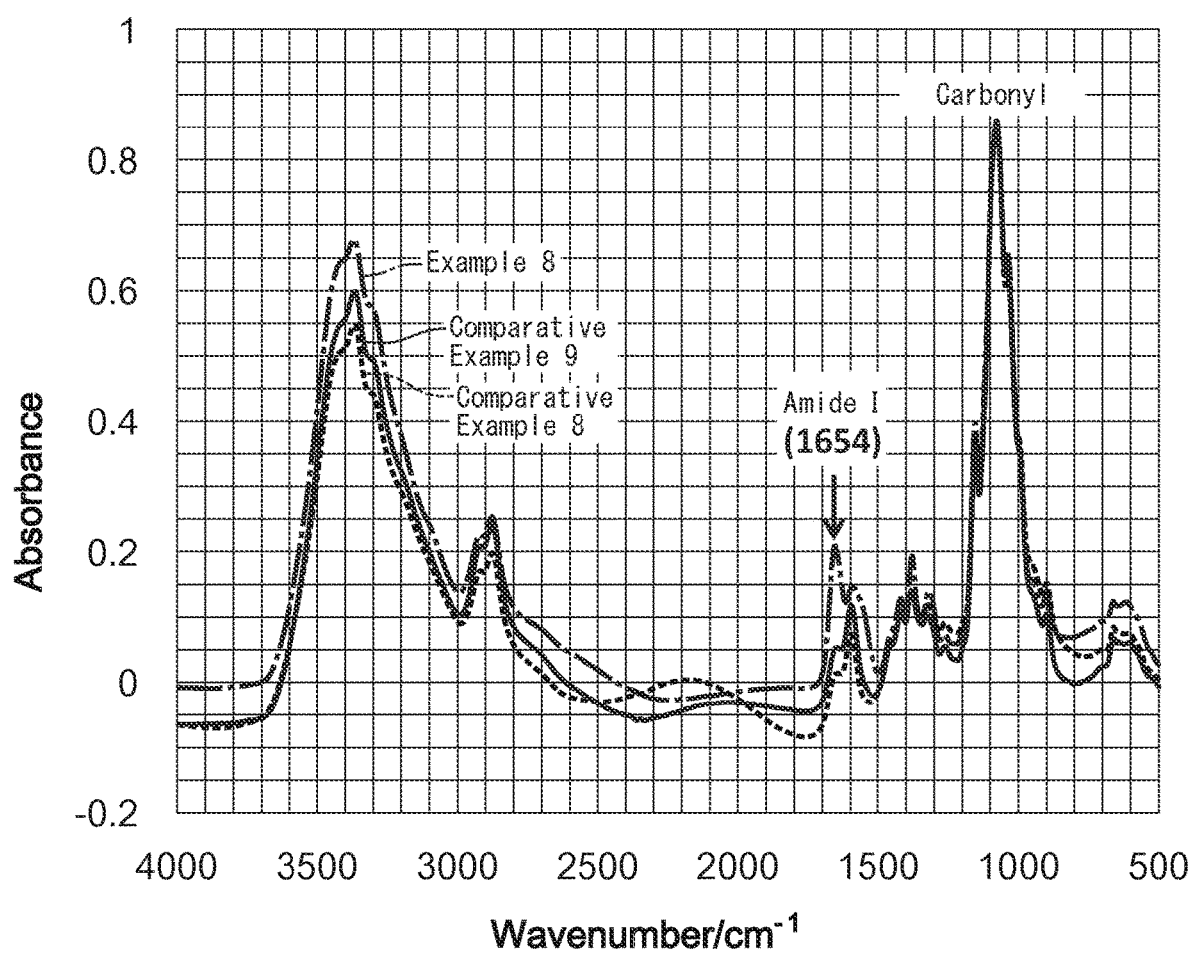
FIG. 5 is an IR chart (all regions) of gas separation membranes obtained in Example 8 and Comparative Examples 8 and 9.
Figure 6:
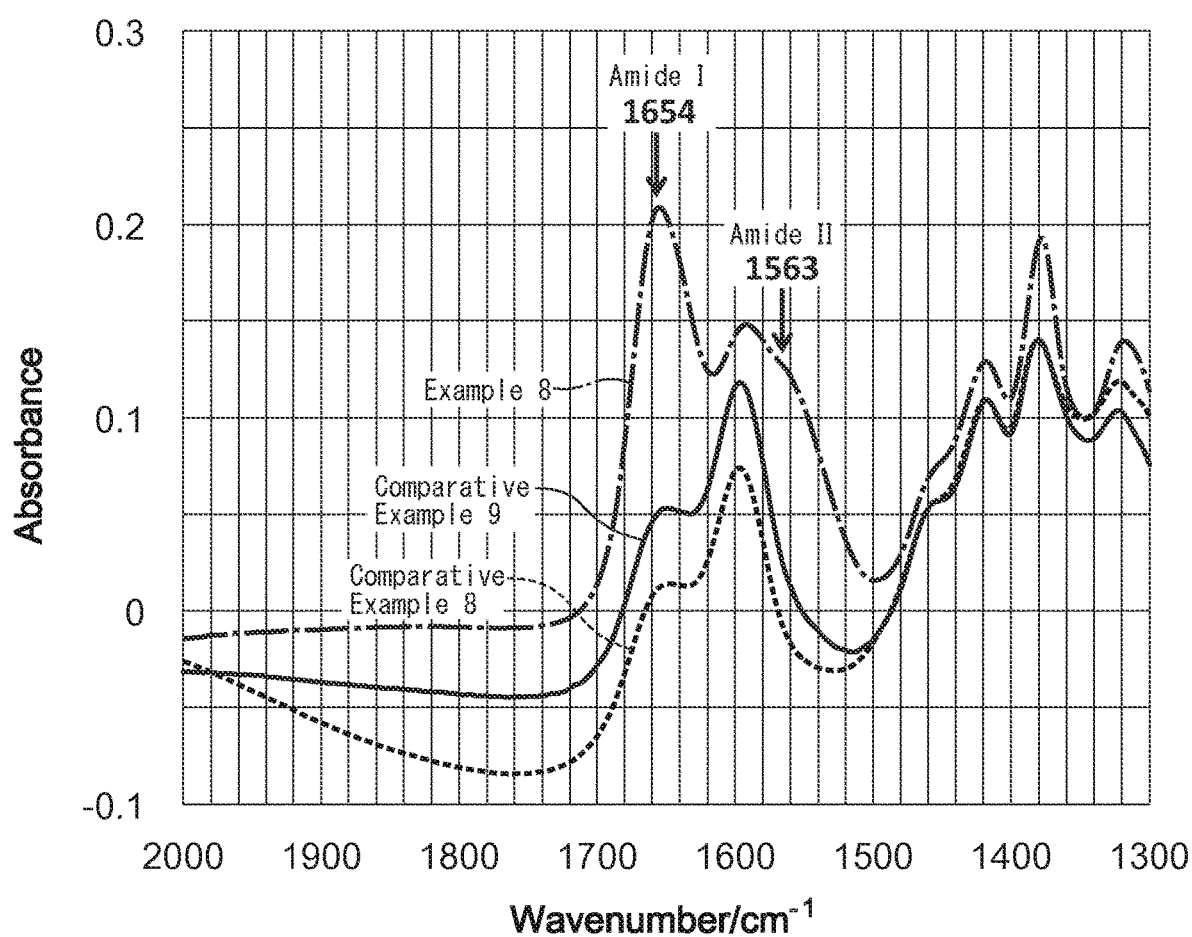
FIG. 6 is an IR chart (enlarged view of the region from 2,000 $cm^{-1}$ to 1,300 $cm^-$) of gas separation membranes obtained in Example 8 and Comparative Examples 8 and 9.

Each of the gas separation membranes obtained by going through the aforementioned drying step was subjected to infrared spectroscopy (IR) analysis. The resulting IR charts are shown in FIGS. 5 and 6.

<X-Ray Diffraction (XRD) Analysis Example (2)>

Degree of crystallization was obtained for each of the gas separation membranes obtained using the same procedures as Example 3 and Comparative Example 1 as well as Example 5 and Comparative Example 6 by XRD.

The procedure consisted of immersing the membranes in 7 M aqueous silver nitrate solution for 24 hours followed by adequately drying in a dark location in a vacuum.

Each of the gas separation membranes obtained by going through the aforementioned drying step was subjected to XRD measurement followed by calculating the degree of crystallization according to the following equation (1). The results of calculating degree of crystallization are shown in Table 5.

$$\text{Degree of crystallinity (\%)} = [I_c/(I_c+I_a)] \times 100 \quad (1)$$

(In equation (1), $I_c$ represents the sum of the integral values of the scattering intensities of the crystalline peaks and $I_a$ represents the sum of the integral values of the scattering intensities of the amorphous halo when having carried out X-ray diffraction analysis on the gas separation membrane.)

TABLE 5

| | Degree of Crystallization (%) |
|---|---|
| Example 3 | 5 |
| Comparative Example 1 | 17 |
| Example 5 | 2 |
| Comparative Example 6 | 18 |

The invention claimed is:

1. A method for producing a gas separation membrane, the gas separation membrane containing:
   a polysaccharide having a degree of crystallinity as represented by the following equation (1) of 17% or less:

$$\text{degree of crystallinity (\%)} = [I_c/(I_c+I_a)] \times 100 \quad (1)$$

(wherein $I_c$ represents the sum of the integral values of the scattering intensities of the crystalline peaks and $I_a$ represents the sum of the integral values of the scattering intensities of the amorphous halo when having carried out X-ray diffraction analysis on the gas separation membrane),
   wherein the polysaccharide has a crosslinked structure, and
   wherein the crosslinked structure of the polysaccharide contains an amide structure, and the method comprising:
   coating a coating solution composed of an aqueous solution containing a polysaccharide onto a supporting substrate to form a coated film;
   immersing the coated film in an aqueous solution containing an acid; and
   following immersion, subjecting the coated film to a heat treatment including a step of heating the polysaccharide to 80° C. or higher under acidic conditions.

2. The method according to claim 1, wherein the polysaccharide has an amino group.

3. A gas separation membrane produced by the method according to claim 1.

4. The gas separation membrane according to claim 3, wherein the hydrate crystal index as represented by the following equation (2) is 65% or less:

$$\text{hydrate crystal index (\%)} = [(I_{10.2} - I_{13})/I_{10.2}] \times 100 \quad (2)$$

(wherein $I_{10.2}$ represents peak intensity at $2\theta = 10.2°$ and $I_{13}$ represents peak intensity at $2\theta = 13.0°$ when having carried out X-ray diffraction analysis on the gas separation membrane).

5. The gas separation membrane according to claim 3, wherein the non-hydrate crystal index as represented by the following equation (3) is 30% or less:

$$\text{non-hydrate crystal index (\%)} = [(I_{15.4} - I_{13})/I_{15.4}] \times 100 \quad (3)$$

(wherein $I_{15.4}$ represents peak intensity at $2\theta = 15.4°$ and $I_{13}$ represents peak intensity at $2\theta = 13.0°$ when having carried out X-ray diffraction analysis on the gas separation membrane).

6. The gas separation membrane according to claim 3, wherein the polysaccharide is chitosan.

7. The gas separation membrane according to claim 3, containing Ag atoms or Cu atoms therewithin.

8. The gas separation membrane according to claim 3, wherein the binding energy of N1s when having carried out X-ray photoelectron spectroscopy on the gas separation membrane is 399.2 eV to 399.9 eV.

9. The gas separation membrane according to claim 3, wherein binding energy of O1s when having carried out X-ray photoelectron spectroscopy on the gas separation membrane is 532.2 eV to 532.7 eV.

10. The gas separation membrane according to claim 3, wherein the permeability coefficient of propylene gas is 100 Barrer to 3,000 Barrer and the separation factor α of propylene/propane is 50 to 1,000 under conditions of a measuring temperature of 30° C. and propylene partial pressure of 0.6 atmospheres.

11. The gas separation membrane according to claim 3, wherein the permeability coefficient of $CO_2$ gas is 70 Barrer to 500 Barrer and the separation factor α of $CO_2/N_2$ is 20 to 100 under conditions of a measuring temperature of 30° C. and $CO_2$ partial pressure of 0.4 atmospheres.

* * * * *